Oct. 22, 1968                R. B. HAILSTONE                3,407,130
    PROCESS OF TREATING POLYVINYLBUTYRAL SHEETING BY AN
    ELECTRIC DISCHARGE IN NITROGEN TO REDUCE BLOCKING
                    Filed Jan. 19, 1966
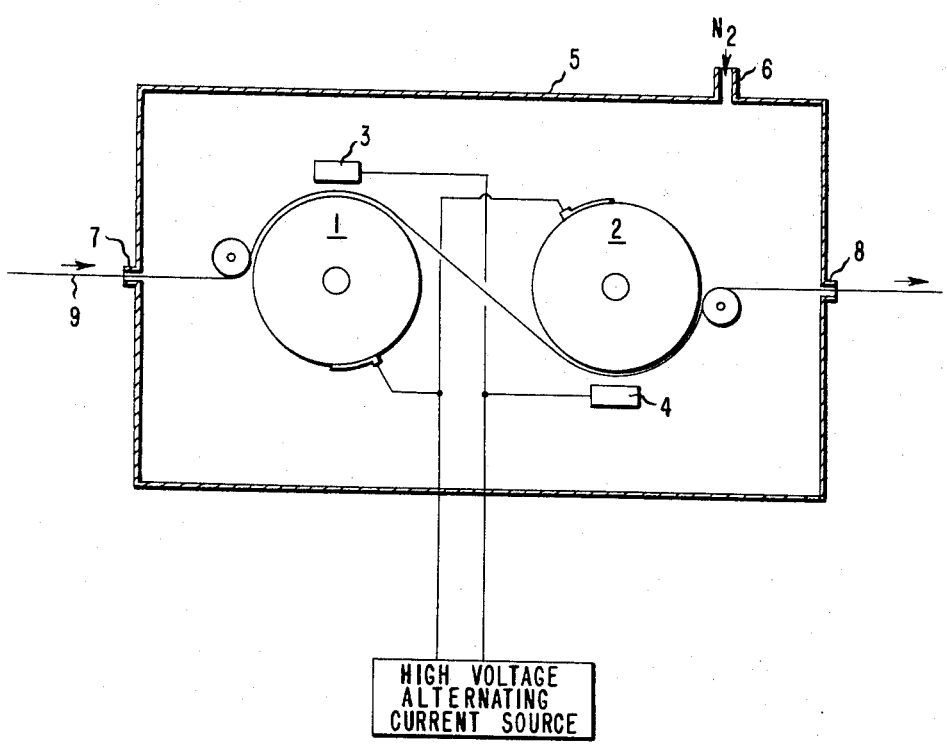
INVENTOR
ROBERT BURLEIGH HAILSTONE
BY Earl L. Handley
ATTORNEY

# 3,407,130
PROCESS OF TREATING POLYVINYLBUTYRAL SHEETING BY AN ELECTRIC DISCHARGE IN NITROGEN TO REDUCE BLOCKING Robert Burleigh Hailstone, Wilmington, Del., assignor to E. I. du Pont de Nemours and Company, Wilmington, Del., a corporation of Delaware
Filed Jan. 19, 1966, Ser. No. 521,600
6 Claims. (Cl. 204—165)

This invention relates to a process for preparing polyvinylbutyral sheeting which has a decreased tendency to block. More specifically, this invention relates to treating polyvinylbutyral by electrical discharge in a nitrogen atmosphere and thereby obtaining a surface on the sheeting that has a decreased tendency to adhere to itself or to other similarly treated polyvinylbutyral sheets.

It is known in the art that blocking may be prevented in polyvinylbutyral sheets by dusting the surface with powder such as sodium bicarbonate or by refrigerating the sheets at temperatures below about 20° C. The dusting procedure has the disadvantage that the powder must be removed from the sheet prior to laminating the sheet into an end-use product such as safety glass, and the refrigerating process has the disadvantage that it requires special handling and special equipment. It has now been found that a polyvinylbutyral sheeting, when treated according to the present invention, may be obtained that does not necessitate the use of either of these known processes.

"Blocking" is the tendency of the sheet to adhere to itself or to another sheet. Blocking as used herein is measured as the force required to pull apart clean powder-free sheets at a constant rate of 20 inches per minute when they have been stored at 20° C. at a relative humidity of 18% under a load of 20 pounds per square inch for 30 minutes. The degree of blocking as expressed herein is the average force required to peel specimens apart per inch width. Blocking is dependent upon the surface pattern of the sheeting, however, a decrease in blocking is obtained when the sheeting is treated according to the present process no matter what the surface pattern of the sheeting is:

The process of the present invention may readily be carried out in an apparatus such as that illustrated in the figure. As shown in the figure, the apparatus comprises two electrode rolls 1 and 2 connected to one side of a regulatable high voltage alternating current source and two spaced electrodes 3 and 4 connected to the other side of a high voltage alternating current source. The sheeting 9 to be treated is fed from an extruder or other source (not shown) through inlet 7 and passes over the surface of the electrode rolls, and as it moves between the electrodes is subjected to an electrical discharge whereby the surface of the sheeting is modified. The sheeting then passes through outlet 8, and may then be rolled for storage. The entire electrode system is enclosed in a container which is connected to a nitrogen source so that the entire container may be swept by nitrogen gas introduced through aperture 6. Instead of employing the apparatus disclosed in the figure, the sheeting may also be treated using an apparatus in which the sheeting passes in contact with a flat electrode and between that electrode and another spaced flat electrode, or individual pieces of sheeting may be mounted on a roller electrode and rotated a repeated number of times under a spaced contoured electrode. Other apparatus for carrying out the process of this invention will also be apparent to one skilled in the art.

In order to obtain a decrease in blocking the sheeting should be subjected to an electrical discharge in an amount of between .025 and .4 watt hour of electrical energy per square foot of sheeting surface. This amount of electrical energy may be effected by operating the electrodes at an alternating current of between .5 and 50 kc. per second and at a voltage of between 1000 v. and 6000 v. using a polyvinylbutyral sheeting having a thickness between 5 and 100 mils. The electrode not in contact with the surface of the polyvinylbutyral sheet should be spaced about .002 to about .15 inch from the surface of the sheet. It is necessary that the treatment be carried out in an atmosprere consisting essentially of nitrogen, that is, an atmosphere in which nitrogen makes up at least about 99% of the molecules present. An electrical discharge treatment when carried out in air or in an inert gas, such as helium or argon, or in the presence of a reactive gas such as ammonia or carbon dioxide, will affect the surface of the polyvinylbutyral sheeting but not to the same extent as the same treatment in a nitrogen atmosphere, and treatment in gases other than nitrogen changes the properties of the sheet not only with respect to blocking but also reduces the adherence of the sheet to glass when the sheet is fabricated into end-use articles such as safety glass. Thus, by the use of a nitrogen atmosphere it is possible to markedly reduce blocking while, at the same time, not substantially affecting the adhesion of the sheeting to glass in end-use articles. The same degree of treatment, that is, the same number of watt hours of electrical energy, in a nitrogen atmosphere, has a markedly greater affect on blocking than the same treatment in the other gases mentioned. If it is desired to reduce adhesion between the sheeting and glass in the end-use article and still operate in a nitrogen atmosphere, it is only necessary to carry out the treatment in such a manner that the amount of electrical energy employed is near the maximum, that is, near .4 watt hour per square foot sheeting surface.

Since the sheeting will be normally stored in rolls or in reams, it is necessary to treat both surfaces of the sheeting in order to produce the desired reduction in blocking, since substantially no reduction in blocking is obtained when a treated surface is contacted with an untreated surface.

In the preferred embodiment of this invention it is desirable to coat one or both electrodes with a dielectric material so that in case the polyvinylbutyral sheeting is not of uniform thickness or contains perforations, there will not be a direct arcing between electrodes. The dielectric coating may take the form of a ceramic coating on the electrodes or it may be a layer of high dielectric strength plastic material such as polyethylene terephthalate. Such dielectric coatings are not, of course, necessary.

In the following examples which illustrate the invention, the plasticized polyvinylbutyral sheeting employed was a commercially available product of 0.015 inch thickness and of 15 inches width, having a grooved or serrated surface pattern in which the height of the serrations is about 0.0005 inch, and a blocking measured as above defined, i.e. 20° C. at 20 p.s.i. load for 30 minutes when not subjected to any treatment, of 4270 millilb./in. The electrode arrangement was generally similar to that shown in the figure, except that only one roller type electrode was employed. Thus, only one side of the sheet was treated in any one pass through the system. The roller electrode was made of stainless steel and about 14 inches in diameter and about 18 inches long. The non-roller electrode(s) was also stainless steel and had a flat surface 2 inches wide and 14 inches long, which surface was centrally mounted next to the roller electrode such that the electrode(s) extended 2 inches in the machine direction. The electrode(s) was coated with about 50 mil of baked-on ceramic and water cooled by internal tubing. In all cases the blocking was measured between two treated surfaces. The relative humidity during treatment was about 35%, and, except as otherwise noted, the treatment was carried out in the presence of a nitrogen atmosphere containing at least about 99% nitrogen by volume, and less than about 1% oxygen by volume. Except as otherwise noted, the electrical frequency was 10 kilocycles, and the sheet moved at a speed of 30 feet per minute. In Examples 12 to 17 two non-roller electrodes were mounted about .5 inch apart spaced adjacent the roller electrode, and in Examples 18 to 26 three non-roller electrodes were mounted about .5 inch apart spaced adjacent the roller electrode. In all other examples only one non-roller electrode was employed.

TABLE I

| Example Number | Watt-hr./ft.² | Volts | Sheeting-to-Electrode Gap, in. | Blocking millilb./in. |
|---|---|---|---|---|
| 1 | .044 | 4,000 | 0.010 | 240 |
| 2 | .072 | 4,500 | 0.010 | 65 |
| 3 | .090 | 5,000 | 0.010 | 65 |
| 4 | .138 | 6,000 | 0.010 | 57 |
| 5 | .0595 | 4,000 | 0.0183 | 192 |
| 6 | .079 | 4,500 | 0.0183 | 81 |
| 7 | .1 | 5,000 | 0.0183 | 77 |
| 8 | .124 | 5,500 | 0.0183 | 55 |
| 9 | .088 | 4,500 | 0.0308 | 270 |
| 10 | .103 | 5,000 | 0.0308 | 200 |
| 11 | .12 | 5,500 | 0.0308 | 100 |

TABLE II

| Example Number | Watt-hr./ft.² | Volts | Sheeting-to-Electrode Gap, in. | Blocking millilb./in. |
|---|---|---|---|---|
| 12 | .0385 | 3,000 | 0.0203 | 98 |
| 13 | .079 | 3,500 | 0.0203 | 25 |
| 14 | .069 | 3,500 | 0.0328 | 47 |
| 15 | .162 | 4,500 | 0.0328 | 87 |
| 16 | .147 | 4,500 | 0.0411 | 174 |
| 17 | .204 | 5,000 | 0.0411 | 107 |

TABLE III

| Example Number | Watt-hr./ft.² | Volts | Sheeting-to-Electrode Gap, in. | Blocking millilb./in. |
|---|---|---|---|---|
| 18 | .0475 | 3,000 | 0.0183 | 63 |
| 19 | .157 | 4,000 | 0.0183 | 80 |
| 20 | .033 | 3,000 | 0.0308 | 70 |
| 21 | .079 | 3,500 | 0.0308 | 58 |
| 22 | .131 | 4,000 | 0.0308 | 194 |
| 23 | .042 | 3,000 | 0.0308 | 313 |
| 24 | .093 | 3,500 | 0.0308 | 54 |
| 25 | .150 | 4,000 | 0.0308 | 167 |
| 26 | .207 | 4,500 | 0.0308 | 81 |

TABLE I4

| Example Number | Watt-hr./ft.² | Volts | Sheeting-to-Electrode Gap, in. | Blocking millilb./in. |
|---|---|---|---|---|
| 27 (Air)* | .328 | 5,100 | 0.02 | 492 |
| 28* | .195 | 4,100 | 0.02 | 40 |

*Examples 27 and 28 were run at 15 kilocycles.

Any polyvinyl butyral resins, for example those disclosed in U.S. Patent 2,345,946 to Overbaugh dated Apr. 4, 1944; U.S. Patent 2,442,75 issued to Stamatoff on June 2, 1947; and in U.S. Patent 2,946,711 issued to Bragaw et al. on July 26, 1960, can be satisfactorily treated by the process of this invention. Typically, the resin sheet has a hydroxyl content of 17 to 25 percent, expressed as weight percent of polyvinyl alcohol and contains a plasticizer in the amount of 20 to 50 parts per 100 parts by weight of the polyvinyl butyral. Preferably, the hydroxyl content is 20 to 24 percent, and the amount of plasticizer is 41 to 48 parts. Typical suitable plasticizers are triethylene glycol di-2-ethyl butyrate; dibutyl sebacate; dibutyl "Cellosolve" adipate and triethylene glycol dihexoate.

I claim:
1. A process for the production of polyvinylbutyral sheeting having a decreased tendency to block which comprises subjecting the sheeting to an electrical discharge in an atmosphere consisting essentially of nitrogen.
2. The process of claim 1 in which the sheet is subjected to between .025 and 0.4 watt hour of electrical energy per square foot of sheeting surface.
3. The process of claim 1 in which the treatment does not substantially affect the adhesion of the sheeting to glass in subsequent laminating operations.
4. The process of claim 1 in which the sheeting is between 5 and 100 mils thick and in which the one major surface of the sheeting is in contact with an electrode and in which the other major surface of the sheeting is spaced from another electrode between .002 inch and .15 inch and in which the sheeting is subjected to between .025 and 0.4 watt hour of electrical energy per square foot of sheeting surface.
5. The process of claim 4 in which the electrical discharge is carried out at a voltage of between 1000 and 6000 volts using an alternating currrent having a frequency between 0.5 and 50 kilocycles per second.
6. The process of claim 5 in which the nitrogen atmosphere contains less than 1% oxygen.

References Cited

UNITED STATES PATENTS 3,309,299   3/1967   Mantell _____ 204—165

ROBERT K. MIHALEK, *Primary Examiner.*